United States Patent [19]

Allegret

[11] Patent Number: 5,837,117
[45] Date of Patent: Nov. 17, 1998

[54] TWO-STAGE PROCESS FOR ELECTROLYTICALLY POLISHING METAL SURFACES TO OBTAIN IMPROVED OPTICAL PROPERTIES AND RESULTING PRODUCTS

[75] Inventor: Francis Allegret, Goncelin, France

[73] Assignee: Satma, Concelin, France

[21] Appl. No.: 646,386

[22] Filed: May 8, 1996

[51] Int. Cl.$^6$ ............................ C25D 11/16; C25D 11/18
[52] U.S. Cl. ............................ 205/50; 205/198; 205/200; 205/201; 205/210; 205/212; 205/213; 205/321; 205/322; 205/323; 205/324; 205/332; 216/88; 428/471; 428/472.1; 428/472.2
[58] Field of Search ...................... 205/213, 324, 205/332, 198, 200, 201, 210, 212, 321, 322, 323, 50; 216/88; 428/471, 472.1, 472.2

[56] References Cited

U.S. PATENT DOCUMENTS

| 2,703,781 | 3/1955 | Hesch et al. | 205/213 |
|---|---|---|---|
| 2,708,655 | 5/1955 | Turner | 205/213 |
| 3,734,837 | 5/1973 | Blair et al. | 205/324 X |
| 4,444,628 | 4/1984 | Furukawa et al. | 205/324 X |
| 5,102,508 | 4/1992 | Bartkowski et al. | |

FOREIGN PATENT DOCUMENTS

| 399172 | 11/1990 | European Pat. Off. . |
|---|---|---|
| 62-37393 | 2/1987 | Japan . |
| 63-125697 | 5/1988 | Japan . |
| 1028397 | 1/1989 | Japan . |

Primary Examiner—Donald R. Valentine
Attorney, Agent, or Firm—Dennison, Meserole, Pollack & Scheiner

[57] ABSTRACT

A process for polishing a metal surface, typically based on Al, Mg, Ta, Ti, Zr, Hf or their alloys, comprises a first conventional polishing step by chemical or electrolytic means and a second electrolytic micro-polishing step by anodizing in a mineral, organic or mixed acid solution to form a oxide layer of the barrier type having a thickness between 100 and 500 nm.

17 Claims, No Drawings

1

TWO-STAGE PROCESS FOR ELECTROLYTICALLY POLISHING METAL SURFACES TO OBTAIN IMPROVED OPTICAL PROPERTIES AND RESULTING PRODUCTS

FIELD OF THE INVENTION

The invention concerns a two-stage process for electrolytically polishing the surfaces of metal products, in particular aluminium or its alloys, by anodizing, to obtain an ultrafine polish leading in particular to a very low micro-roughness and in consequence to an improved reflectivity and/or reduced iridescence and/or perfect images.

The invention also concerns the products obtained and their applications.

DESCRIPTION OF RELATED ART

In order to obtain sheets (or standard size sheets), strips or more generally reflecting products based on aluminium or its alloys, it is known conventionally to use "bright" or "extra bright" rolled material, on which is carried out an electrolytic polishing stage with the aid of a bath conventionally consisting for example of a mixture of phosphoric acid, sulphuric acid and chromic oxide, a selective pickling stage of the residual oxide layer, a protection stage by porous anodizing, also electrolytic, with the aid of a bath based on sulphuric acid or oxalic acid or chromic acid or phosphoric acid to form a porous layer of oxide, for which the mean diameter of the basic hexagonal unit is generally between 70 and 200 nm, the roughness of the metal at the metal/oxide interface being greater than 1.5 nm(Ra), and then a stage for sealing the porous layer by treatment with boiling water. Normally, the roughness of the sealed surface obtained is not generally less than 5 nm. A specular reflectivity is then obtained (in a direction of 20°) of the order of a maximum of 78%.

In the following text, unless indicated to the contrary, all the values of reflectivity given will be specular reflectivities corresponding to those obtained with the aid of a Dr. LANGE reflectometer, according to the DIN standard 67-530.

A metal surface may also be polished chemically or mechanically to obtain equivalent results.

To improve the reflectivity, it is known to carry out, in addition to the preceding treatments, a series of successive depositions usually performed under vacuum in a gaseous phase; for example deposition of aluminium followed by a double so called bi-layer deposition of $SiO_2$ followed by $TiO_2$. Such a complex deposit enables a reflectivity of 86% to be obtained due to interference phenomena obtained by a judicious choice of refractive indices and the respective thicknesses of the oxide layers approaching $\lambda/4n$, $\lambda$ being the mean wave length of light radiation and n the refractive index of the oxide. It is also possible to deposit successively several bi-layers which enables the reflectivity to be improved and to approach 100% for a large number of bi-layers.

However, obtaining such a result requires a succession of electrochemical and under vacuum treatments which makes the final product particularly costly, difficult and complex to produce, in particular when deposits are laid down under vacuum on very wide strips passing continuously.

Non-anodized articles of aluminium (or its alloys) are also known from the Alusuisse-Lonza patent CA2059046 which are suitable for the deposition of layers in a gaseous phase, the said layers facilitating reflection with as small as possible losses in energy. The said non-anodized articles are preferably obtained by rolling. They may be polished electrolytically or electrochemically. Although roughnesses over a very wide range (from 1 to 1000 nm(Ra)) are indicated, the means enabling the lowest roughnesses to be obtained are not detailed. In fact the Applicant has measured that with this type of process the roughness was generally greater than 30 nm. These surfaces can be covered, as previously, physically by one or more transparent layers to increase the reflectivity. The articles obtained do not exhibit iridescence.

Taking into account what has preceded, the Applicant has sought to develop a micro-polishing process which is simple to put into operation industrially and economically, making it possible in particular to achieve increased micro-roughness and reflectivity performances; for example improved specular reflectivity generally exceeding 80% with a starting product of the extra-bright rolled type, whereas the reflectivity of this product treated conventionally according to the prior art does not exceed 78%. Iridescence is avoided, but if needed a uniform coloration can be obtained.

The Applicant has also sought to develop products having optical or other high performances, owing to a very low micro-roughness of the surface.

SUMMARY OF THE INVENTION

The invention is a process for polishing a metal surface comprising a first conventional polishing stage by chemical or preferably electrolytic means, in a solution which may contain, among others, phosphoric acid, and a second electrolytic micro-polishing stage by anodizing in a mineral, organic or mixed acid solution to form a porous oxide layer with a very fine structure or preferably an oxide layer of the barrier type.

It is essential that the first stage is a chemical or electrolytic polishing stage to obtain the desired very low micro-roughness, polishing of the mechanical type not enabling such a result to be obtained. It should be noted that electrolytic polishing is particularly advantageous since it proves to be much more efficient and enables better optical performances to be obtained (image clarity).

It is advantageous to pickle selectively the oxide layer formed during the first polishing stage and/or during the micro-polishing stage.

Intermediate pickling carried out after the polishing stage makes it possible to remove selectively, as in the prior art, the residual oxide layer appearing during the said first polishing stage. Although advantageous, it is not however necessary to carry it out, since micro-polishing occurs just as well in the presence of the said residual oxide layer, since it occurs under this layer.

Final pickling carried out after the micro-polishing stage makes it possible to remove selectively the barrier layer or porous layer with a very fine structure, in the case where it is desired to have available for example a metal surface as it is, either with a view to a special application for which such a surface is sufficient, or with a view to forming a supplementary protective layer or to improve its optical properties, as will be seen further on. It also makes it possible, in the case where there is no intermediate pickling, to remove the residual oxide layer which would prevent, for example, any subsequent deposition of a supplementary layer. The final pickling may be omitted if it is desired to preserve the barrier layer or porous layer with a very fine structure formed during micro-polishing.

The surfaces treated according to the invention have a micro-roughness of less than 1.4 nanometers Ra, and a developed surface of less than 103% (with respect to an ideally planar surface for which the roughness Ra is equal to 0 nm and the developed surface is 100%).

A metal surface may generally be characterized by a macro-roughness and a micro-roughness.

Processes of the prior art act mainly on the macro-roughness by removing surface asperities (rolling or extrusion scratches and lines, surface tears and surface faults due to moulding etc); for example, the roughness referred to previously in patent CA 2059046 can, it seems, be at best of the order of 1 to 10 nm(Ra), without a person skilled in the art knowing how to obtain lower roughnesses.

The present invention allows macro-polishing to be supplemented by micro-polishing which enables the roughness to be reduced to very low values, always lower than 1.4 nm(Ra) and, in the case where micro-polishing is carried out with the aid of a barrier layer, always lower than 1 nm(Ra), usually less than 0.8 nm(Ra), or even 0.5 nm(Ra), the prior art never describing any process enabling such levels to be attained.

The invention can thus be advantageously used not only for polishing and improving surfaces of the bright and extra-bright type, but it also is of great value for improving the finish of coarser surfaces such as untreated rolled finishes (known more usually under the term "mill finish"), or modified surfaces, in particular of the matt, brushed, hammered, pebbled, or wrinkle-finish type with a substantially diffuse reflection. Micro-polishing is then obtained which is superimposed to some extent on the initial surface state with a large reduction in micro-roughness and, consequently, an equally large gain in total reflectivity.

The starting pieces may be varied and are generally standard size sheets, continuously passing strips or objects of any geometry whatsoever. For present reflecting pieces, the surface state generally has a roughness Ra of between 10 and 150 nm and a reflectivity of 61 to 78%.

Before carrying out polishing operations according to the invention, a degreasing operation is generally carried out on the surface to be treated. The first conventional polishing treatment is then carried out by chemical means or preferably electrolytic means by anodizing in a polishing bath, for example based on phosphoric acid, for example with the aid of a mixture in aqueous solution of phosphoric acid, sulphuric acid and nitric acid or a mixture of phosphoric acid, sulphuric acid and chromic oxide, or any other polishing bath.

This polishing is preferably followed by a deoxidizing stage or selective pickling with the aid of a solution composed for example of a mixture of phosphoric acid and chromic oxide. In a variant of the invention, this intermediate pickling is not used, as will be seen further on.

In this stage, only the residual oxide derived from the electrolytic polishing operation is dissolved, the metal surface remaining unaltered.

The surface, preferably deoxidized, is then subjected to a second anodizing treatment in a solution of mineral, organic or mixed acids, under conditions permitting the formation preferably of a compact barrier layer (generally at a voltage of between 15 and 1000 V and preferably between 70 and 350 V) or a porous anodic layer with a very fine structure, the diameter of the basic hexagonal cells of which is usually less than 30 nm.

The thickness of the anodic layer thus formed is generally between 20 and 2000 nm and preferably from 100 to 500 nm.

In the case of the formation of a barrier layer, its thickness is more particularly between 20 and 1400 nm.

Formation of the barrier layer is particularly effective and enables lower roughnesses to be obtained; it is preferably amorphous and the thickness of the anodic layer can be controlled by the voltage.

The oxide layer formed during the second anodizing treatment (micro-polishing) can then be selectively pickled as has been said above.

Such a process has the advantage of using economical treatments of the conventional type, which can easily be used industrially, in particular for continuous treatment, while producing a significant improvement in the characteristics of the treated surfaces.

Unexpectedly, it appeared that the fact of forming an outside layer anodically according to the invention after the usual electrolytic polishing operation enabled particularly effective complementary micro-polishing of the surface to be obtained, which may be qualified as super-polishing.

In point of fact, examination with taping mode atomic force microscopy (TM-AFM) has shown that the honeycomb cellular structure of the metal-oxide interface obtained after conventional electrolytic polishing has in general a roughness Ra of 4 to 10 nm, a diameter of the basic hexagonal cells of 70 to 200 nm (dimensions greater than those which have been observed are equally possible) and a developed surface of 110 to 130% (with respect to an ideally planar surface as seen above) and that this cellular structure was completely levelled by the formation of the barrier layer or the porous layer with a very fine structure. During this formation, super-polishing was carried out such that, in this case, the roughness became less than 1 nm(Ra) in the case of a barrier layer, or 1.4 nm(Ra) in the case of a micro-porous layer and the developed surface was then reduced to less than 101% or 103% respectively. Consequently, the reflectivity increased by at least two points.

BRIEF DESCRIPTION OF THE DRAWINGS

FIGS. 1 and 2 show the topography of metal surfaces in three dimensions (perspective), respectively after the first conventional electrolytic polishing stage and following the micro-polishing treatment by anodic formation of a barrier layer according to the invention (micro-polishing) and of course, in both cases, after selective solution of the oxide layer formed.

DESCRIPTION OF THE PREFERRED EMBODIMENTS

In FIG. 1, the dark zones correspond to honeycomb-shaped cells obtained on the surface of a sheet of Al of 99.99% purity after conventional electrolytic polishing and deoxidizing with the aid of a phospho-chromic solution, and the light zones to the walls separating the cells.

The profile of the roughness is clearly seen on the section made in the plane oriented in direction Z (vertical).

Examination of FIG. 2, where the preceding sheet has been subjected to anodic treatment forming a barrier coat 280 nm thick at 200 V and then pickling of this layer, shows that the previous honeycomb relief has disappeared and has been replaced by an almost perfectly smooth surface which exhibits no more than slight undulation, having moreover a very small amplitude and a high pitch, the trace of which can be seen on the plan in the direction Z.

The process of the invention is particularly suitable for aluminium and its alloys, as well as for magnesium and its alloys. It is also applicable to Ti, Ta, Zr, Hf and to their alloys.

The oxides formed, as well as the barrier layers or porous layers with a fine structure according to the invention, are based on the oxides of the corresponding metals used, for example alumina in the case of aluminium and its alloys.

Examples of the compositions of various treatment baths, as well as the operating conditions, are shown below. These are those which have been used to carry out the examples which are given later on.

Other compositions or operating conditions producing the same effect are possible.

| Degreasing: | |
|---|---|
| NaOH | 50 g |
| Surface active agent | 0.01 g |
| Water | 1000 ml |
| Temperature | 50° C. |
| Time | 30 sec |
| Electrolytic polishing: | |
| $H_3PO_4$ 85% | 600 ml |
| $H_2SO_4$ 92% | 200 ml |
| Crystalline $CrO_3$ | 5 g |
| $H_2O$ | 200 ml |
| Temperature | 60° C. |
| Current density | 20 A/dm$^2$ |
| Time | 120 sec |
| Deoxidizing: | |
| $H_3PO_4$ 85% | 23 ml |
| Crystalline $CrO_3$ | 40 g |
| $H_2O$ | 977 ml |
| Temperature | 100° C. |
| Time | 5 min |
| Electrolytic micro-polishing by formation of a barrier layer: | |
| Tartaric acid | 30 g |
| $H_2O$ | 1000 ml |
| pH | adjusted to 5 using $NH_4OH$ |
| Temperature | 25° C. |
| Time | 3 min |
| Voltage | 200 volts |
| Electrolytic micro-polishing by formation of a micro-porous layer with a very fine structure: | |
| $H_2SO_4$ 92% | 90 ml |
| $H_2O$ | 910 ml |
| Temperature | 10° C. |
| Time | 3 min |
| Voltage | 15 V |

The invention also concerns the products obtained, namely the parts or products with a metal surface having a roughness always less than 1.4 nm(Ra) and more particularly, in the case of the formation of a barrier layer, less than 1 nm, more often less than 0.8 nm or better still 0.5 nm, illustrated in particular by the surface of FIG. 2. On account of this, these surfaces possess improved optical qualities, simply and at least cost, in particular an increase in reflectivity and a pronounced reduction in the developed surface, as has already been said. The improvement also relates not only to the specular reflectivity when the metal surfaces treated are reflecting surfaces, but also to the total reflectivity when the surfaces treated are surfaces of the mill-finish type or matt or modified surfaces (brushed, hammered, pebbled or others..) which do not have a specular reflectivity but a diffuse reflectivity. Similarly, whatever the light source used, there is no unwanted iridescence.

As an illustration, an extra-bright rolled sheet, after treatment according to the invention, enables a surface roughness Ra to be obtained of 0.5 nm corresponding to a developed surface of 100.38%.

Although the metal surfaces according to the invention can be used as such for special applications requiring little or no protection, they often however prove to be fragile for normal applications. It is then advantageous to protect them, for example against corrosion or abrasion. This protection can be obtained by preserving the anodic barrier layer or porous layer obtained according to the invention (for this, it is sufficient to omit a final pickling, intermediate pickling then being carried out, as has been said). It is also possible to cover the surface, bare or already covered with the oxide layer according to the invention, with a varnish, a gel, a deposit under vacuum of one or more suitable materials ($SiO_x$, polymers, various oxides, or any other protective layer) and/or with an anodic protective layer.

In addition, in order to increase still further the optical properties of the surfaces obtained, it is also possible to produce suitable deposits, for example an optical bi-layer deposit of the interference type making it possible to obtain a reflectivity which can reach 86%.

In relation to the choice of protective layer and/or of the level of performance aimed at, the invention can be applied according to various, non-limiting variants, described below.

Variant 1 degreasing (acid, alkaline, solvent or others), then a water wash electrolytic polishing, then a water wash deoxidation with the aid of a solution containing $H_3PO_4$+$CrO_3$ or others, then a water wash micropolishing by formation of a barrier layer with a thickness of 20 to 1400 nm (preferably 100 to 500 nm), then washing with deionized water and possible drying.

The metal surface obtained is thus covered with a particularly economical barrier layer.

Variant 2 degreasing (alkaline, acid, solvent or others), then a water wash electrolytic polishing, then a water wash deoxidizing ($H_3PO_4$+$CrO_3$ or others), then a water wash micropolishing by formation of a barrier layer having a thickness of between 20 to 1400 nm (preferably 100 to 500 nm), then a water wash deoxidizing ($H_3PO_4$+$CrO_3$ or others), then washing with deionized water and possible drying.

The metal surface obtained is thus bare. It has the best gain in reflectivity and makes it possible subsequently to apply any other deposit.

Variant 3 degreasing (alkaline, acid, solvent or others), then at water wash electrolytic polishing, then a water wash micropolishing by formation of a barrier layer having a thickness of between 20 to 1400 nm (preferably 100 to 500 nm), then a water wash deoxidizing ($H_3PO_4$+$CrO_3$ or others), then washing with deionized water and possible drying.

The metal surface obtained is bare and the process is also economical (absence of intermediate pickling) and as before it is possible to apply any other deposit subsequently or to use the surface as it is for special applications.

Variant 4 degreasing (alkaline, acid, solvent or others), then a water wash electrolytic polishing, then a water wash deoxidizing ($H_3PO_4$+$CrO_3$ or others), then a water wash micropolishing by formation of a porous anodic layer with a very fine structure (diameter of basic hexagonal cells less than 30 nm) having a thickness of 20 to 2000 nm (preferably 100 to 500 nm), then a water wash deoxidizing ($H_3PO_4$+$CrO_3$ or others), then washing with deionized water and possible drying.

This variant is analogous to variant 2.

Variant 5 degreasing (alkaline, acid, solvent or others), then a water wash electrolytic polishing, then a water wash micropolishing by formation of a porous anodic layer with a very fine structure (diameter of basic hexagon cells less than 30 nm) having a thickness of 20 to 2000 nm (preferably 100 to 500 nm), then a water wash deoxidation ($H_3PO_4$+$CrO_3$ or others), then wash with deionized water and possible drying.

This variant is analogous to variant 3.

As has been said above, the metal surface may be covered with the aid of various protective deposits or layers applied directly to the metal surface according to the invention but also to the anodic layer with a view to reinforcing and/or modifying the characteristics. The following non-limiting possibilities may illustrate these advantages:

Use of an anodic barrier layer:

variant 1 (without final pickling of the barrier layer) makes it possible to obtain a reflecting surface possessing a minimum of protection under the most economical conditions possible. By fixing the thickness of the layer between 140 and 200 nm, a non-coloured product is obtained with a high reflectivity. If a greater thickness is used, a coloration is obtained by interference which varies according to the thickness;

variant 2 (with pickling of the barrier layer) followed by formation of a protective barrier layer identical to that described above leads to the most optically effective product of the five variants described;

variant 3 (with pickling of the barrier layer and without intermediate pickling) followed by formation of a protective barrier coat makes it possible to obtain a quality level intermediate between the two previous ones.

Use of a barrier layer is particularly valuable since the thickness of the layer thus formed is the same over all the surface and can be controlled with a precision of less than 1% over all the surface treated. It will thus be possible to obtain surfaces which have corrosion and abrasion resistance while having a reflectivity greater than 80%, either without interference iridescence or visible coloration, or coloured in a homogeneous manner, the coloration being determined by the thickness of the barrier layer.

By way of example, the barrier layers may be formed with the aid of baths of the type seen above for micro-polishing by barrier layer, the voltage used then being 110 to 140 V to obtain thicknesses of 140 to 200 nm.

Use of a porous anodic layer:

Conventional porous anodic layers, 1000 to 5000 nm thick, can be formed on surfaces resulting from variants 1 to 5 with, naturally, final sealing of the pores according to the usual techniques.

Use of a physical or chemical mono-layer deposit:

Deposits of the type consisting of $SiO_x$, organic polymers or various oxides, can be applied either chemically or by deposition techniques under vacuum (PVD or CVD), replacing the barrier layers referred to above. Their thickness may vary from 100 to 2000 nm. The best optical performances are obtained from variant 2. The protective properties are comparable to those of the porous anodic layer.

Use of varnishes or gels:

Varnishes or gels of various types can be applied to the treated surfaces, for example according to variants 1, 2 5 and 3.

Use of multi-layer deposits:

Many combinations of materials deposited by physical or chemical means are possible. For example variant 1 comprising the formation of a barrier layer (for example 140 nm thick), or in an equivalent manner of a porous layer with a very fine structure, followed by the deposition, for example by evaporation under vacuum of an $SiO_2$ layer (for example 150 nm thick) results in protection having an improved corrosion resistance while preserving the high reflectivity of the surface.

Use of interference bi-layer deposits:

In order to obtain reinforcement of the reflectivity properties, it is known, as has been already seen, how to produce a double oxide deposit under vacuum with a suitable thickness and refractive index on a polished metal surface. The use of a single bi-layer enables a reflectivity of 86% to be obtained. A large number of identical bi-layers deposited on the same surface could enable, in the limiting case, a reflectivity of close to 100% to be obtained.

The following bi-layers may be quoted as non-limiting examples:

variant 1+$Al_2O_3$ barrier (t=76–83 nm)+$TiO_2$ (t=55–61 nm)

variant 1+$Al_2O_3$ barrier (t=76–83 nm)+$ZrO_2$ (t=61–67 nm)

variant 1+$Al_2O_3$ barrier (t=76–83 nm)+$Ta_2O_5$ (t=59–65 nm)

variant 2+$SiO_2$ (t=86–95 nm)+$ZrO_2$ (t=61–67 nm)

variant 2+$Al_2O_3$ barrier (t=76–83 nm)+$TiO_2$ (t=55–61 nm)

variant 2+$MgF_2$ (t=91–100 nm)+$TiO_2$ (t=55–61 nm)

variant 2+$Al_2O_3$ barrier (t=76–83 nm)+$ZrO_2$ (t=61–67 nm):

For each type of oxide, the range of thicknesses (t) indicated enables a compromise to be obtained between the maximum reflectivity and the removal of residual colorations.

The examples above are also applicable to variants 3, 4 and 5.

The bi-layer deposits can be produced directly on the metal surface obtained according to the invention, but it is also possible to use as the first layer of the said bi-layer deposit the anodic barrier layer or porous layer with a very fine structure obtained during the micropolishing treatment, the second layer being a transparent dielectric oxide with a refractive index in general greater than 2.

Use of mixed multi-layer deposits:

They are used to optimize the corrosion and abrasion resistance properties and at the same time to obtain reinforcement of the optical properties of the interference type. For this purpose bi-layer deposits can also be deposited on an opaque metal layer (for example of Al or Ag), itself deposited on the metal surface obtained according to the invention, covered or not by the barrier layer or microporous layer with a very fine structure formed during micro-polishing and/or covered with another protective deposit (for example an anodic barrier layer). For example, it is possible to form a conventional anodic layer (typically 2000 nm thick) followed by a triple deposit under vacuum: Al (50 to 100 nm), then $Al_2O_3$ (or $SiO_2$ or $MgF_2$) and $TiO_2$ (or $ZrO_2$ or $Ta_2O_5$) with the thicknesses indicated above for the interference bi-layer deposits. The reflectivities are identical to those referred to above (86%), but the product is costly. It is particularly applied to metal surfaces obtained in the variants 1 to 5.

Use of mixed anodic layers

In certain cases, it may be advantageous to achieve protection of the surface by successively forming a porous layer and a barrier layer. This is applicable in particular to metal surfaces obtained in variants 1 to 5.

The invention also concerns the use of products obtained having a metal surface as it is, or advantageously covered by a deposit intended to improve its protection and/or its optical properties (reflectivity, colour etc.). It is advantageously possible to use these products, which are particularly efficient while being economical, in the field of optical reflectors for all wave lengths, more particularly in the field of lighting or heating, but also of computer disks, photocopier or printer drums, high performance mirrors, micro-electronic circuits, micro-mechanical components, decorative reflecting surfaces, various reflectors, etc.

As an illustration of the invention, table 1 gives the results for the roughness and reflectivity of metal surfaces based on aluminium obtained according to the prior art or according to the invention with or without an additional deposit. The specular reflectivities given in the direction transverse to rolling (R20T) or in the longitudinal direction (R20L).

TABLE 1

| Example | Surface treatment procedure | Final surface condition | Final surface roughness (Ra) nm | Developed surface % | Specular reflectivity for an angle of incidence of 20° | |
|---|---|---|---|---|---|---|
| | | | | | R20 T % | R20 L % |
| 1 | Prior art | Mill finish (extra-bright), degreased | 11.5 | 103.8 | 77.6 | 77.7 |
| 2 | Prior art | As example 1, then electrolytically polished and deoxidized | 5.0 | 124.0 | 81.8 | 81.9 |
| 3 | Prior art | As example 2, then protection by H$_2$SO$_4$ anodizing (porous layer of 2000 nm) and sealing | 4.5 | 115.5 | 77.5 | 78.2 |
| 4 | Prior art | As example 3, then deoxidizing by selective pickling of the porous oxide layer | 2 | 104.0 | 82.1 | 82.3 |
| | Variants | | | | | |
| 5 | n° 2 | Bare metal surface | 0.7 | 100.3 | 84.7 | 84.8 |
| 6 | n° 3 | Bare metal surface | 0.5 | 100.4 | 83.9 | 83.6 |
| 7 | n° 1 | Barrier layer 200 nm thick | 0.8 | 100.3 | 83.3 | 83.4 |
| 8 | n° 2 | Barrier layer 182 nm thick | 0.8 | 100.2 | 84.3 | 84.5 |
| 9 | n° 1 | Barrier layer 182 nm thick | 1.0 | 100.4 | 83.6 | 83.8 |
| 10 | n° 2 | Porous anodic layer 2000 nm thick | 1.2 | 102.9 | 80.8 | 81.2 |
| 11 | n° 1 | Barrier layer 80 nm thick + TiO$_2$ layer 57 nm thick | 1.3 | 103.0 | 85.8 | 86.1 |
| 12 | n° 4 | Porous anodic layer 2000 nm thick | 1.4 | 102.8 | 79.2 | 79.8 |
| 13 | n° 5 | Bare metal surface | 1.3 | 102.0 | 81.0 | 81.4 |

In the examples prepared according to variants 2, 3 and 4, the anodic layers were formed at 200 V during the anodic micropolishing stage according to the invention and were 260 nm thick.

It will be seen that the metal surface according to the invention has a roughness clearly less than that of surfaces obtained according to the prior art and thus produces a significant gain in reflectivity.

It is worth noting that when the metal surface according to the invention is covered with a deposit, this deposit retains a very low roughness, sometimes even less than 1 nm (which is an advantage) and in general significantly less than that obtained in the prior art. Similarly, the reflectivity is improved compared with that of surfaces polished according to the prior art and covered with the same deposit.

The same is the case for all types of protection described above: the gain produced by the second polishing stage—micro-polishing—is preserved.

I claim:

1. Process for polishing a metal surface comprising:
    a first polishing step by chemical or electrolytic means to obtain a surface roughness less than about 10 nm, followed by
    a second electrolytic micro-polishing step by anodizing in a solution of mineral acid, organic acid or mixture thereof to form an oxide layer of barrier oxide layer having a thickness between about 100 and 500 nm.

2. Process according to claim 1, additionally comprising a selective pickling treatment of oxide formed during the first polishing step and/or during the micro-polishing step.

3. Process according to claim 1 wherein the metal surface is based on Al, Mg, Ta, Ti, Zr, Hf or their alloys.

4. Process according to claim 1, wherein the metal surface being polished is of the bright, extra-bright, mill finish, matt, brushed, hammered, pebbled, or wrinkle-finish surface.

5. Process according to claim 1, additionally comprising at least one further step for producing one or more complementary layers for protecting the metal surface and/or improving its optical properties.

6. Process according to claim 5, wherein the at least one additional step is selected from the group consisting of anodic formation of a barrier layer and/or a porous anodic layer, deposition by physical or chemical means, and deposition of varnish or gels.

7. Part or product having a polished metal surface obtained according to the process of claim 1, wherein the polished metal surface has a micro-roughness measured after deoxidizing the anodic layer by selective pickling of less than 1.4 nm(Ra).

8. Part or product according to claim 7, wherein the polished metal surface results from polishing of a surface of the bright or extra-bright surface.

9. Part or product according to claim 7, wherein the surface being polished is of mill finish, matt, brushed, hammered, pebbled, or wrinkle-finish surface.

10. Part or product according to claim 7 covered with at least one additional thin layer intended to ensure protection of the metal surface and/or to improve its optical properties.

11. Part or product according to claim 10, wherein the at least one thin layer is selected from the group consisting of anodic layers, mono-layers or multi-layers deposited by chemical or physical means and varnishes or gels.

12. Part or product according to claim 10, wherein the polished surface is based on aluminum or its alloys and the the at least one additional layer forms an interference optical bilayer including a first layer comprising an alumina barrier layer formed anodically on the substrate during micro-polishing and a second layer comprising a transparent dielectric oxide.

13. Part or product according to claim 12, wherein the transparent dielectric oxide has a refractive index greater than 2.

14. Part or product according to claim 10, wherein the polished surface is covered with a protective anodic layer, followed by an opaque metal layer, followed by one or more interference bi-layer deposits.

15. Part or product according to claim 14, wherein the opaque metal layer is Al or Ag.

16. Part or product possessing a polished metal surface according to claim 7, wherein the barrier type layer formed during micro-polishing has a thickness of between 140 and 200 nm to ensure resistance of the surface to corrosion and abrasion while producing a specular reflectivity greater than 80% and the absence of interference color.

17. Part or product according to claim 7, wherein the polished metal surface has a micro-roughness of less than 1 nm(Ra).

* * * * *